United States Patent
Wilson et al.

(10) Patent No.: US 10,594,885 B1
(45) Date of Patent: Mar. 17, 2020

(54) SYSTEM AND METHOD FOR UPDATING MULTIFUNCTION PERIPHERAL DEVICE CODES

(71) Applicant: Toshiba TEC Kabushiki Kaisha, Shinagawa-ku (JP)

(72) Inventors: Silvy Wilson, Santa Margarita, CA (US); Milong Sabandith, Irvine, CA (US)

(73) Assignee: Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 16/170,481

(22) Filed: Oct. 25, 2018

(51) Int. Cl.
H04N 1/00 (2006.01)
H04W 76/14 (2018.01)
H04W 84/12 (2009.01)

(52) U.S. Cl.
CPC ....... *H04N 1/00973* (2013.01); *H04N 1/0097* (2013.01); *H04N 1/00244* (2013.01); *H04N 1/00307* (2013.01); *H04N 1/00411* (2013.01); *H04W 76/14* (2018.02); *H04N 2201/006* (2013.01); *H04N 2201/0094* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2006/0098221 A1* | 5/2006 | Ferlitsch | H04N 1/00352 358/1.13 |
| 2009/0059273 A1* | 3/2009 | Tomita | H04N 1/00204 358/1.15 |
| 2010/0069008 A1* | 3/2010 | Oshima | H04W 4/02 455/41.3 |
| 2014/0240778 A1* | 8/2014 | Itogawa | G06F 3/1292 358/1.15 |
| 2014/0355048 A1* | 12/2014 | Kang | G06F 3/1292 358/1.15 |
| 2015/0070725 A1* | 3/2015 | Monden | G06F 3/1232 358/1.15 |
| 2015/0138597 A1 | 5/2015 | Koshigaya | |
| 2015/0212769 A1 | 7/2015 | Norota et al. | |
| 2015/0358761 A1 | 12/2015 | Ito | |
| 2017/0290078 A1* | 10/2017 | Suzuki | H04W 76/14 |

* cited by examiner

*Primary Examiner* — Miya J Williams
(74) *Attorney, Agent, or Firm* — Ulmer & Berne LLP

(57) ABSTRACT

A system and method for updating of device codes in a multifunction peripheral includes a portable data device having a processor and associated memory and a touchscreen user interface. An input receives a device code set corresponding to a desired multifunction peripheral configuration and the codes are stored in the memory. The processor generates a selectable one click prompt on the touchscreen. The processor enables the input prompt for user selection in when a wireless data interface is in active communication with the multifunction peripheral. The processor determines that the input prompt has been selected and sends the device code set to the multifunction peripheral via the wireless data interface.

14 Claims, 7 Drawing Sheets

FIG. 5

| 05 | Adjustment mode | Image quality control | Image quality closed loop control contrast voltage correction/Full mode maximum number of time corrected | 2670 | Sets the maximum correction number of time of the contrast voltage in the closed-loop control full mode. |
| 05 | Adjustment mode | Image Processing | Sharpness adjustment | 8113 | 0: Sharpness OFF<br><br>The larger the value, the sharper the image becomes.<br><br>The smaller the value, the softer the image becomes. |

| 08 | Setting mode | Process | Fuser | Fusing temperature | Center thermistor | 2010 | 0 | Plain/Monochrome/Normal temperatures | 10 | 0~16 | M | 0: 90 °C  1: 95 °C  2: 100 °C  3: 105 °C  4: 110 °C  5: 115 °C  6: 120 °C  7: 125 °C  8: 130 °C  9: 135 °C  10: 140 °C  11: 145 °C  12: 150 °C  13: 155 °C  14: 160 °C  15: 165 °C  16: 170 °C |
|---|---|---|---|---|---|---|---|---|---|---|---|---|
| 08 | Setting mode | Process | Development | Toner density ratio manual offset control | M | 2707 | 1 | M | 0 | 0~8 | M | 0: Disabled  1: +4bit  2: +7bit  3: +10bit  4: +14bit  5: -4bit  6: -7bit  7: -10bit  8: -14bit   When setting the value of this code to other than "0", set the value of |

FIG. 6A

| | Setting mode | System | Network | MDS | Authentication | | | | 08-2506 (Enable/disable setting of toner density correction control) to "0" (Disabled). |
|---|---|---|---|---|---|---|---|---|---|
| 08 | | | | | | 3640 | Authentication of MDS system | SYS | 0: Disabled (Normal mode)<br>1: Enabled (MDS authentication mode)<br>* If the EWB license has not been installed at startup, this code becomes "0". |
| | | | | | | | | 0~1 | |
| | | | | | | | | 0 | |

FIG. 6B

SYSTEM AND METHOD FOR UPDATING MULTIFUNCTION PERIPHERAL DEVICE CODES

TECHNICAL FIELD

This application relates generally to configuring multifunction peripherals. The application relates more particularly to updating multifunction peripheral configuration via configuration codes received from a portable data device.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Given the expense in obtaining and maintain MFPs, devices are frequently shared or monitored by users, servers or technicians via a data network. MFPs, while moveable, are generally maintained in a fixed location. While remote device monitoring is common, there is still a need to occasionally dispatch a service technician for on-site MFP maintenance. Maintenance may include repair, parts replacement or upgrading, or device configuration. MFPs are intelligent devices that may be configured by software, firmware or hardware settings. Such configuration may be accomplished by device codes which can control functions such as security settings, feature accessibility, activity logging, document handling, or network connectivity. Device codes can typically be entered directly on an MFP user interface once the device is placed in administrative mode. In one example, a service technician places a MFP in administrative mode via its touchscreen interface. They then can enter device codes, which can be a complex sequence of characters. Inputting of individual device codes can be very time consuming, particularly when a large number of codes are required for entry. There may also be many MFP devices on a premises that require code updates, making the process even more burdensome. When so many characters are input, there is a chance, if not a likelihood, that errors will be made. An erroneous code input can, at best, cause a misconfigured device or, at worst, damage or cripple and MFP or one or more of its functions.

BRIEF DESCRIPTION OF THE DRAWINGS

Various embodiments will become better understood with regard to the following description, appended claims and accompanying drawings wherein:

FIG. 5 is an example embodiment of device code settings for multifunction peripherals; and FIG. 6A is another example embodiment of multifunction peripheral device code settings; and FIG. 6B is a continuation of the table of code settings of FIG. 6A.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with an example embodiment of the subject application, a system and method for updating of device codes in a multifunction peripheral includes a processor and associated memory and a touchscreen user interface. An input receives a device code set corresponding to a desired multifunction peripheral configuration and the codes are stored in the memory. The processor generates input indicia on the touchscreen. The processor enables the input indicia for user selection input when a wireless data interface is in active communication with the multifunction peripheral. The processor determines that the input indicia has been selected and sends the device code set to the multifunction peripheral via the wireless data interface.

Figure 1:
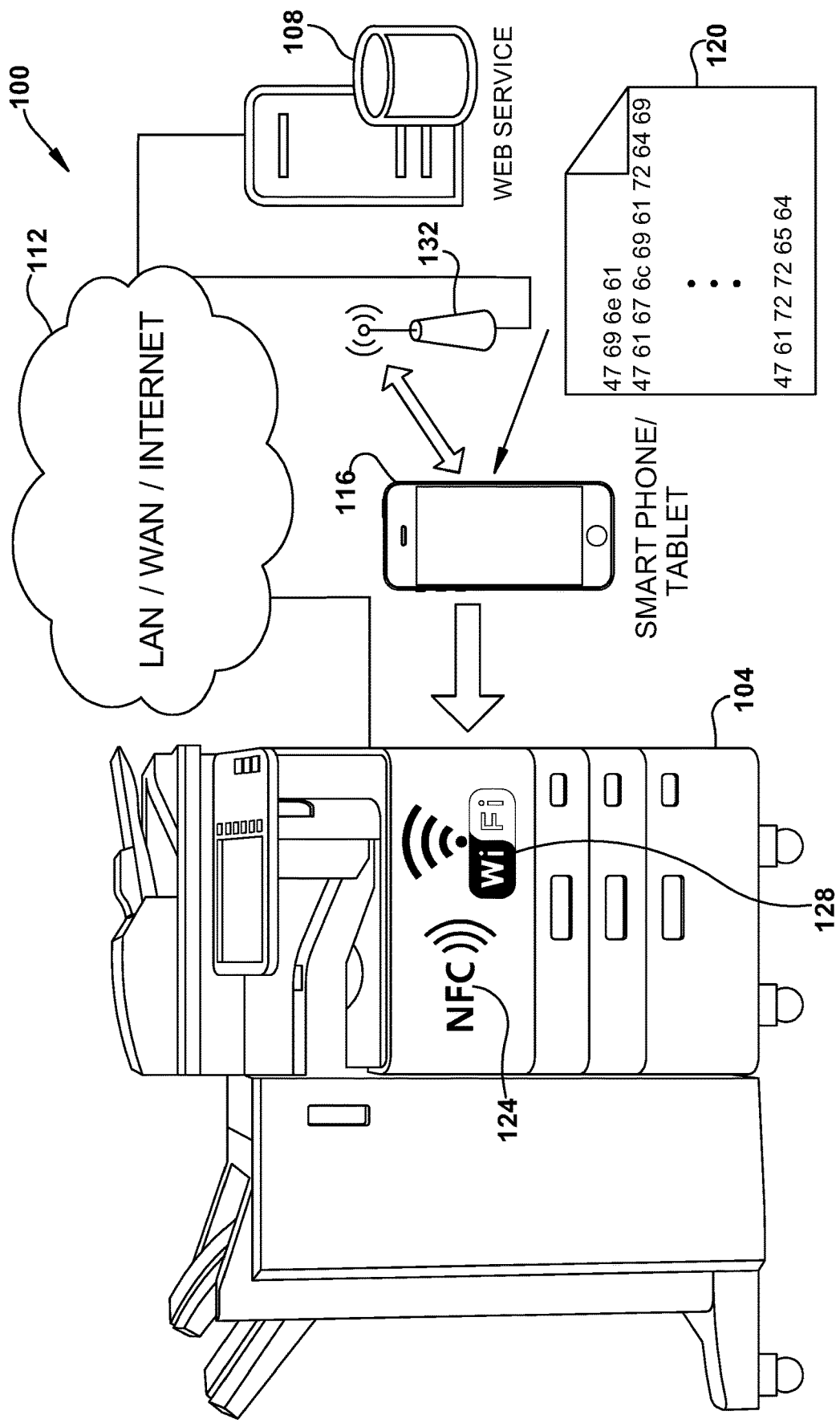
FIG. 1 is an example embodiment of a system for updating device codes.

In accordance with the subject application, FIG. 1 illustrates an example embodiment of a system 100 for updating device codes, such as updating device codes on MFP 104. MFP 104 is in data communication with a monitoring web service server 108 via network cloud 112. Network cloud 112 is any suitable wireless or wired data path, such as a local area network (LAN), wide area network (WAN), which may comprise the Internet, or any suitable combination thereof. A portable data device 116 is illustrated as a smartphone, but it is to be understood that any suitable portable data device may be used, including a notebook computer, smart watch or tablet computer. Smartphone 116 is provided with a processor and data storage, in addition to wireless communication including Bluetooth, nearfield communication (NFC) or Wi-Fi. Device codes 120 are input into smartphone 116 storage in any suitable manner, including via device user interface, download, memory card, scan, or the like. Device codes 120 appear in hexadecimal by way of example only. Any suitable device code setting scheme may be used, as further exampled below.

MFP 104 includes a NFC system 124 and a Wi-Fi communication system 128. A device controller, such as that illustrated in FIG. 2 below, functions to sense, via NFC, when smartphone 116 is proximate to MFP 104. Once sensed, MFP 104 communicates connection information for device code transfer to smartphone 116. Communication instructions may include a device address or communication protocol. By way of further example, MFP 104 may establish a Bluetooth, Wi-Fi or Wi-Fi direct connection with smartphone 116. A Wi-Fi connection is suitably via cloud 112 via access point 132. MFP 104 obtains the new device codes from smartphone 116, either directly through an established data channel. Device codes are also suitably obtained by MFP 104 by via web service server 108 which suitably accepts and process device codes for MFP 104.

Figure 2:
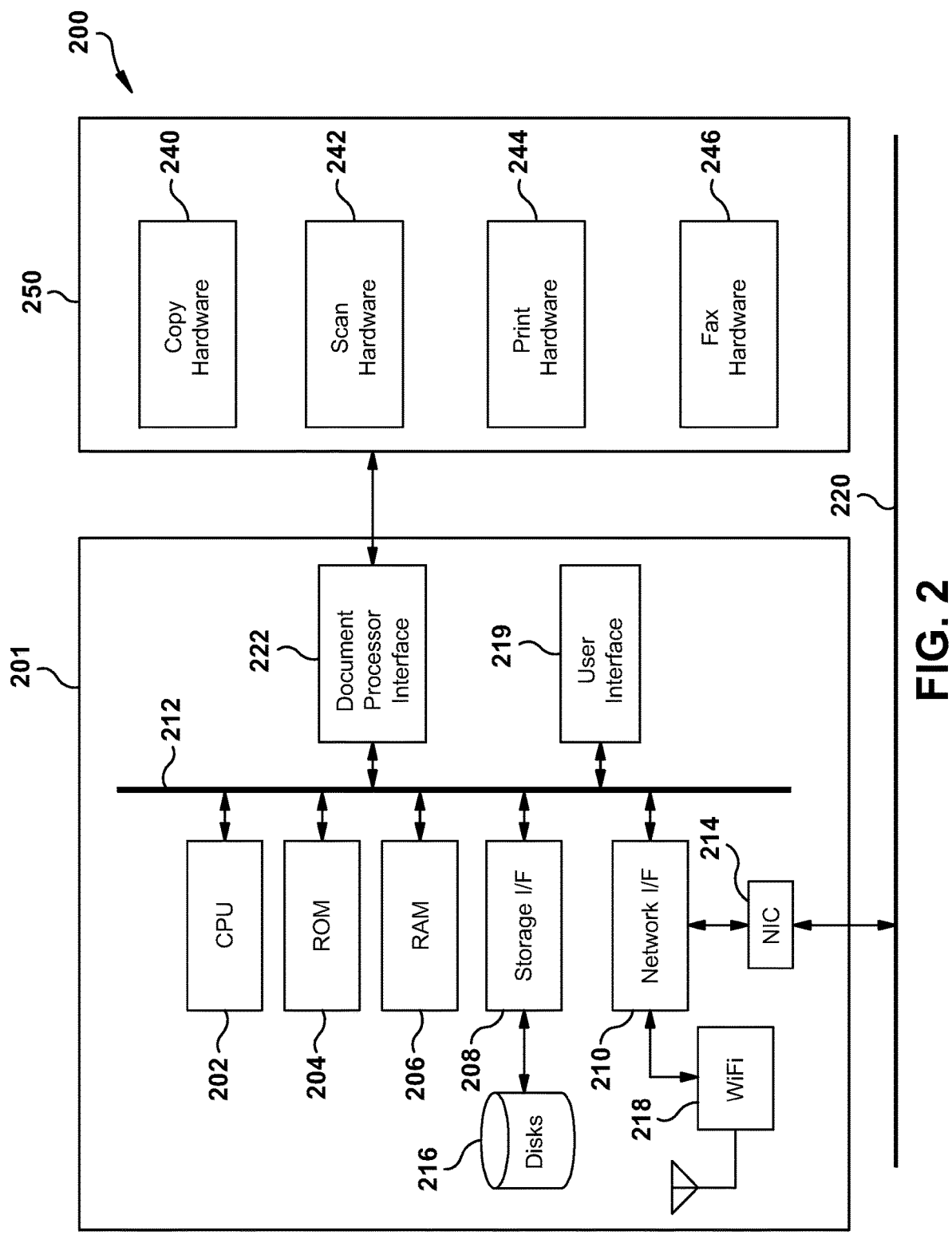
FIG. 2 is a block diagram of an example embodiment of a multifunction peripheral.

Turning now to FIG. 2 illustrated is an example embodiment of a MFP device comprised of a document rendering system 200 suitably comprised within an MFP, such as with MFP 104 of FIG. 1. Included in intelligent controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with one or more sensors which provide data relative to a state of the device or associated surroundings, such as device temperature, ambient temperature, humidity, device movement and the like.

Processor 202 can also be in data communication with any suitable user input/output (I/O) interface 219 which provides data communication with user peripherals, such as displays, keyboards, mice, track balls, touch screens, or the like. Hardware monitors suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Intelligent controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
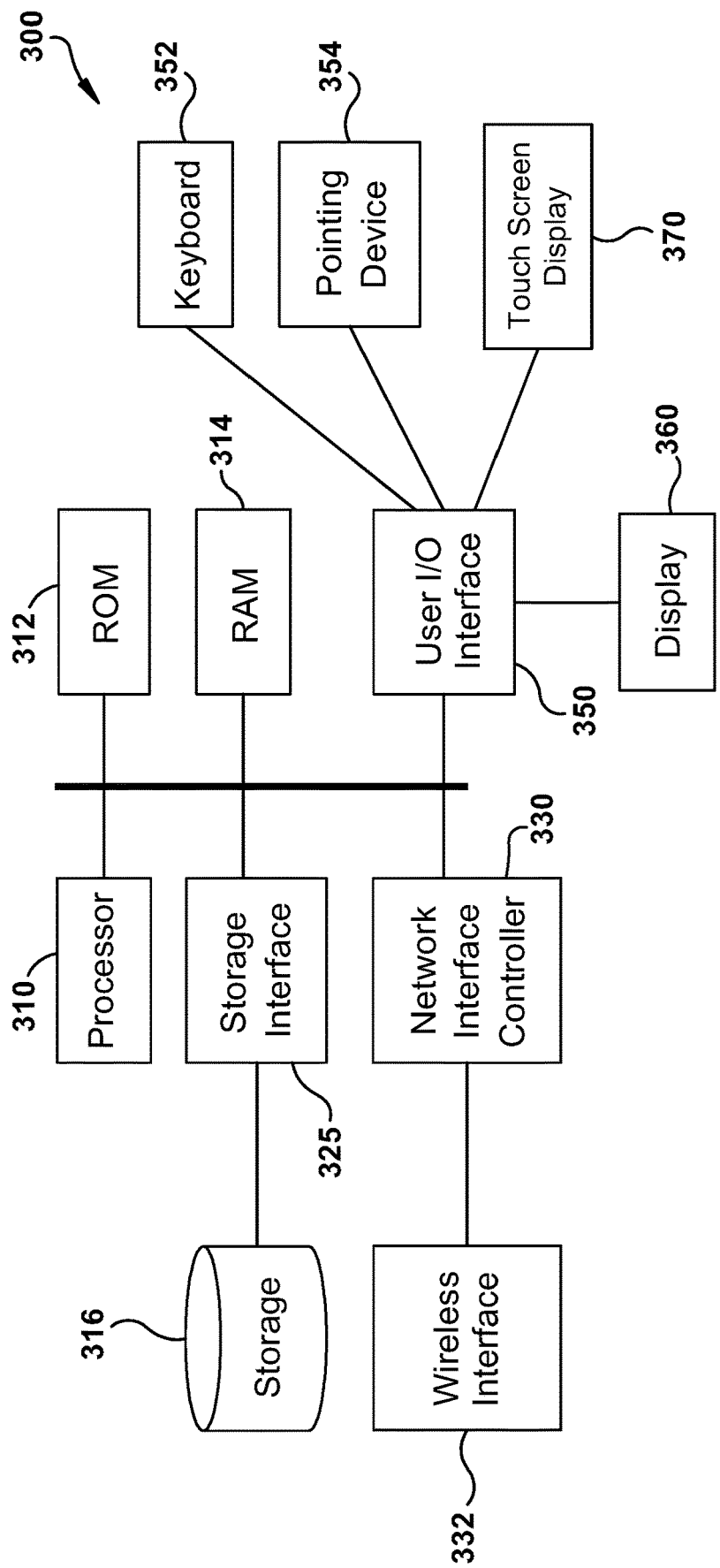
FIG. 3 is an example embodiment of a digital data device.

Turning now to FIG. 3, illustrated is an example embodiment of a suitable portable digital device 300 such a smartphone 116. Included are one or more processors, such as that illustrated by processor 310. Each processor is suitably associated with non-volatile memory, such as read only memory (ROM) 312 and random access memory (RAM) 314, via a data bus.

Processor 310 is also in data communication with a storage interface 325 for reading or writing to a data storage system 316, suitably comprised of a hard disk, optical disk, solid-state disk, or any other suitable data storage as will be appreciated by one of ordinary skill in the art.

Processor 310 is also in data communication with a network interface controller (NIC) 330, which provides a data path to any suitable wired or physical network connection via physical network interface, or to any suitable wireless data connection via wireless interface 332, such as one or more of the networks detailed above. The system suitably uses location based services.

Processor 304 is also in data communication with a user input/output (I/O) interface 350 which provides data communication with user peripherals, such as display 360, as well as keyboards 352, mice, track balls, or other pointing devices 354, touch screen 370, or the like. It will be understood that functional units are suitably comprised of intelligent units, including any suitable hardware or software platform.

Figure 4:
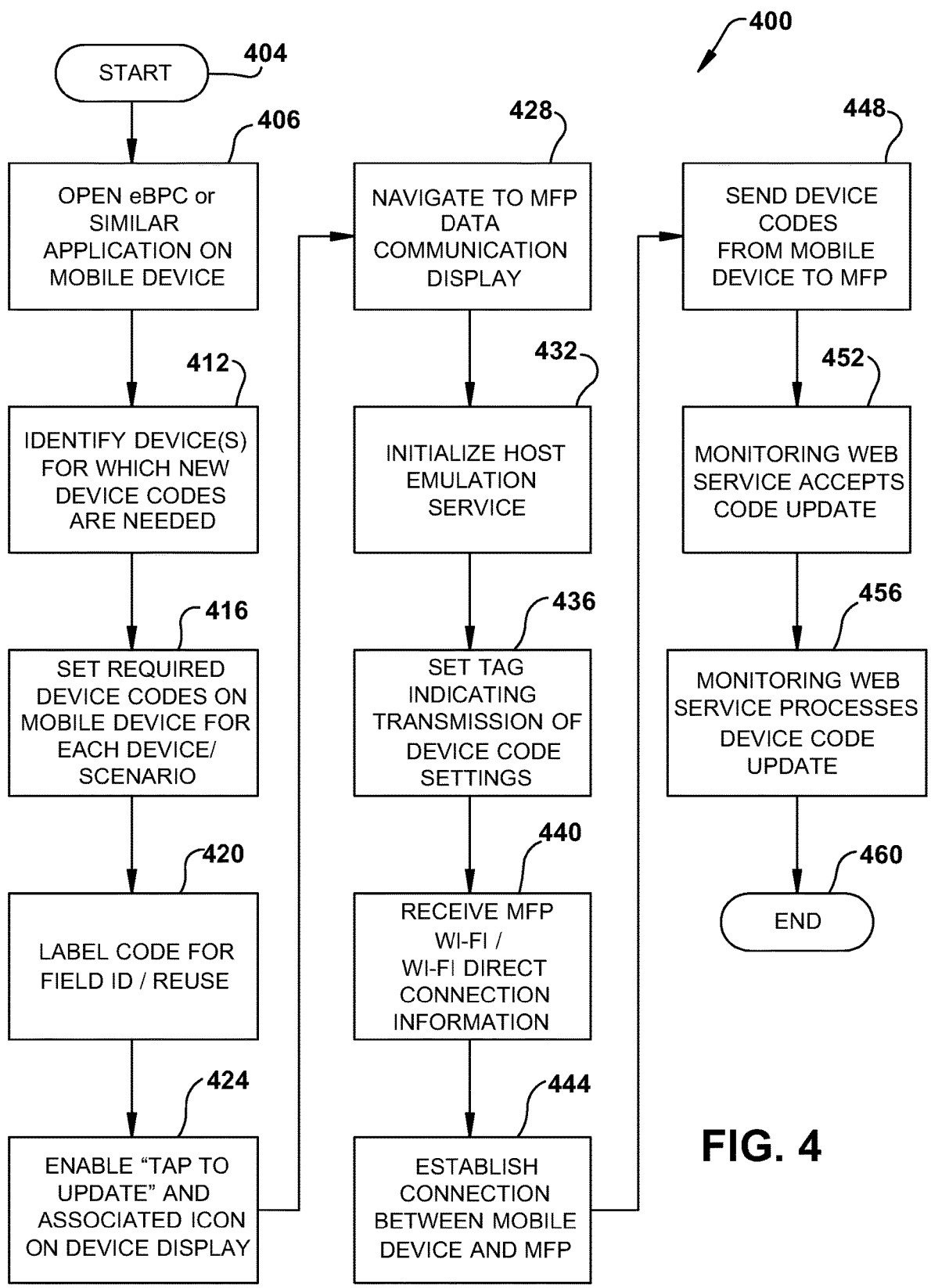
FIG. 4 is a flowchart of an example embodiment of device code updating.

FIG. 4 is a flowchart 400 of an example embodiment of assisted device code updating. The process commences at block 404 and proceeds to block 406 where an application is launched on device, such as a smartphone. A suitable application is eBridge Print & Capture (eBPC) available from Toshiba Tec. eBPC is an Android/iOS application for interfacing between MFPs and portable devices. See, for example: https://business.toshiba.com/downloads/KB/flUlds/11948/e-BRIDGE_PrintAndCapture_SetupGuide_en.2015.10.23.pdf, the contents of which are incorporated herein by reference.

Next, at block 412, devices for which new codes are needed are identified, and at block 416 the required device codes are stored on the portable data device for each MFP to be updated, which may comprised different code sets for different devices or device scenarios. Device code sets are suitably labeled at block 420 for future recall for use. Next, a "tap to update" icon is suitably generated on the portable data device touchscreen at block 424 which enables a service technician to update the device code set on an MFP via a selectable one click prompt on the portable data device touchscreen. The service technician approaches a target MFP at block 428 and a host emulation service is commenced at block 432. A tag indicating transmission of device code settings is set at block 436 and the portable data device receives connection information for code transfer at block 440 and a data connection is established at block 444. While any suitable data transfer mechanism may be used, a desirable alternative is to establish a Wi-Fi direct connection between the MFP and portable data device, thus eliminating any need for routing via a network cloud. Device codes are communicated to the MFP at block 448, and a monitoring web service accepts them at block 452. Next, the monitoring web service processes the device code update at block 456 and the process ends at block 460.

FIG. 5 is a table 500 of example device codes and their associated setting. FIGS. 6A and 6B illustrate further example device codes and their associated settings.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   a touchscreen user interface configured to receive a user instruction to enter a tap-to-update mode;
   an input configured to receive a device code set corresponding to a desired multifunction peripheral configuration;
   a wireless data interface configured for wireless data communication with a multifunction peripheral; and
   a processor and associated memory,
      the memory configured to store the device code set,
      the processor configured enable a near field communication after receipt of the user instruction,
      the processor configured to determine when near field communication is established with an associated multifunction peripheral,
      the processor configured to receive a network connection information for the multifunction peripheral from the multifunction peripheral via near field communication once established,
      the processor configured to enable the wireless data interface for data communication with the multifunction peripheral in accordance with received network connection information,
      the processor configured to generate a tap-to-update input indicia on the touchscreen when the wireless data interface is in data communication with the multifunction peripheral,
      the processor configured to enable the input indicia for user selection,
      the processor further configured to determine that the input indicia has been selected,
      the processor further configured to send the device code set to the multifunction peripheral via the wireless data interface after the user input has been selected, and
      the processor is further configured to initiate processing of the device code set on the multifunction peripheral in accordance when acceptance is received from associated web service.

2. The system of claim 1 wherein the wireless data interface is comprised of a Wi-Fi communication interface.

3. The system of claim 2 wherein the Wi-Fi communication interface is further comprised of a Wi-Fi direct interface.

4. The system of claim 1 wherein the wireless data interface is comprised of a near field communication interface.

5. The system of claim 4 wherein the wireless interface is further comprised of a Wi-Fi communications interface, and wherein the processor is further configured to send the device code set to the multifunction peripheral via the Wi-Fi communications interface in accordance with Wi-Fi connection information received from the multifunction peripheral via the near field communication interface.

6. The system of claim 5 wherein the processor is further configured to enable the input indicia for user selection when a Wi-Fi connection has been established with the multifunction peripheral.

7. The system of claim 6 wherein the Wi-Fi connection information is configured to establish a Wi-Fi direct data communication channel with the multifunction peripheral.

8. A method comprising:
   receiving into memory a device code set corresponding to a desired multifunction peripheral configuration;
   generating, via a processor, tap-to-update indicia on a touchscreen for user selection of a tap-to-update mode;
   establishing a near field communication session with an associated multifunction peripheral after receipt of a user selection of the indicia;
   receiving network information for the multifunction peripheral via an established near field communication session;
   enabling a wireless data interface with the multifunction peripheral in accordance with received network information;
   enabling a device update indicia on the touchscreen for user selection when the wireless data interface is in active communication with the multifunction peripheral;
   determining that the device update indicia has been selected;
   sending the device code set to the multifunction peripheral via a wireless data interface; and
   initiating processing of the device code set on the multifunction peripheral in accordance with acceptance received from an associated web service.

9. The method of claim 8 further comprising sending the device code set via a Wi-Fi communication interface.

10. The method of claim 9 further comprising sending the device code set via a Wi-Fi direct interface.

11. The method of claim 8 further comprising receiving Wi-Fi connection information from the multifunction peripheral via the near field communication interface and sending the device code set to the multifunction peripheral via a Wi-Fi communications interface in accordance with received Wi-Fi connection information.

12. The method of claim 11 wherein further comprising establishing a Wi-Fi direct data communication channel with the multifunction peripheral.

13. A multifunction peripheral comprising:
   a document processing engine operable in accordance with instructions received from an intelligent controller;
   a network interface;
   a near-field module operable for data communication with an associated near-field transceiver; and
   the intelligent controller including a processor and associated memory,
      the memory storing configuration data corresponding to configuration of the multifunction peripheral,
      the processor configured to determine a presence of a nearby portable data device in accordance with an established near-field communication session with the associated near-field transceiver,
      the processor further configured to communicate Wi-Fi connection data to the portable data device via the via the near-field communication session,
      the processor further configure to receive configuration codes from the portable data device via a Wi-Fi connection established with the Wi-Fi connection data,
      the processor further configured to reconfigure the multifunction peripheral in accordance with updated configuration data corresponding to a received confirmation code indicative of acceptance of the updated configuration data by a monitoring web service.

14. The multifunction peripheral of claim 13 wherein the processor is further configured to receive the configuration codes via a Wi-Fi direct connection with the portable data device established with the Wi-Fi connection data.

* * * * *